US008832284B1

(12) United States Patent
Owens et al.

(10) Patent No.: US 8,832,284 B1
(45) Date of Patent: Sep. 9, 2014

(54) VIRTUAL SOCIALIZING

(75) Inventors: David Halliday Owens, San Jose, CA (US); Robert Jonathan Spiro, San Francisco, CA (US); Daniel Ming-Wei Chu, Sydney (AU); Loren Michael Groves, Sunnyvale, CA (US); Richard James Dunn, Jr., Seattle, WA (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 13/355,291

(22) Filed: Jan. 20, 2012

Related U.S. Application Data

(60) Provisional application No. 61/497,923, filed on Jun. 16, 2011.

(51) Int. Cl.
*G06F 15/16* (2006.01)

(52) U.S. Cl.
USPC ............................ 709/228; 709/205; 709/223

(58) Field of Classification Search
None
See application file for complete search history.

(56) References Cited

U.S. PATENT DOCUMENTS 5,375,068 A * 12/1994 Palmer et al. ................. 709/204
5,793,365 A 8/1998 Tang et al.
5,880,731 A 3/1999 Liles et al.
7,016,935 B2 * 3/2006 Lee et al. ....................... 709/204
7,620,902 B2 11/2009 Manion et al.
7,752,553 B2 7/2010 Pennington et al.
7,822,809 B2 10/2010 Dhupelia et al.
7,865,566 B2 1/2011 Ashtekar et al.
7,984,098 B2 * 7/2011 Enete et al. ................... 709/204
8,032,470 B1 10/2011 Heidenreich et al.
8,538,895 B2 9/2013 Appelman et al.
2001/0048449 A1 12/2001 Baker
2002/0130904 A1 9/2002 Becker et al.
2003/0074451 A1 4/2003 Parker et al.
2004/0186887 A1 9/2004 Galli et al.
2004/0218035 A1 11/2004 Crook
2004/0249811 A1 12/2004 Shostack et al.
2004/0260781 A1 12/2004 Shostack et al.
2005/0273503 A1 12/2005 Carr et al.
2006/0031772 A1 2/2006 Valeski
2006/0098085 A1 5/2006 Nichols
2006/0176831 A1 8/2006 Greenberg et al.
2006/0182249 A1 8/2006 Archambault et al.

(Continued)

OTHER PUBLICATIONS

NNRD435158. "Automatically Moderated Group Debate on the Internet." IBM Technical Disclosure Bulletin. Jul. 2000, UK. Issue 435, p. 1299.*

(Continued)

*Primary Examiner* — Jeffrey R Swearingen
(74) *Attorney, Agent, or Firm* — Remarck Law Group PLC

(57) ABSTRACT

In general, techniques of the present disclosure are directed to a system for virtual socializing between electronic devices. In one example, the method includes joining, by a first computing device, a communication session enabling communication between the first computing device and a second computing device. The method includes outputting, multimedia content that is output at the second computing device. The method also includes receiving and outputting, by the first computing device, data from the second computing device using the communication session, while the multimedia content is outputting at the first output device, where the data comprises data captured by an input device of the second computing device. The method further includes sending a configuration request that sets a control model mode of the communication session, where the control model mode controls which computing devices communicatively coupled via the communication session has permission to modify at least the multimedia content.

17 Claims, 8 Drawing Sheets

(56) References Cited

U.S. PATENT DOCUMENTS

| | | | |
|---|---|---|---|
| 2007/0020603 | A1 | 1/2007 | Woulfe |
| 2007/0050452 | A1 | 3/2007 | Raju |
| 2007/0071209 | A1 | 3/2007 | Horvitz et al. |
| 2007/0169165 | A1 | 7/2007 | Crull et al. |
| 2007/0208806 | A1 | 9/2007 | Mordecai et al. |
| 2007/0211141 | A1 | 9/2007 | Christiansen |
| 2007/0233291 | A1 | 10/2007 | Herde et al. |
| 2007/0299912 | A1 | 12/2007 | Sharma et al. |
| 2008/0070697 | A1 | 3/2008 | Robinson et al. |
| 2008/0140523 | A1 | 6/2008 | Mahoney et al. |
| 2008/0192732 | A1 | 8/2008 | Riley et al. |
| 2008/0201638 | A1 | 8/2008 | Nair |
| 2008/0209339 | A1 | 8/2008 | Macadaan et al. |
| 2008/0209351 | A1 | 8/2008 | Macadaan et al. |
| 2008/0222533 | A1 | 9/2008 | Hankejh et al. |
| 2008/0260138 | A1 | 10/2008 | Chen et al. |
| 2009/0040289 | A1 | 2/2009 | Hetherington et al. |
| 2009/0063995 | A1 | 3/2009 | Baron et al. |
| 2009/0222742 | A1 | 9/2009 | Pelton et al. |
| 2010/0057857 | A1 | 3/2010 | Szeto |
| 2010/0082693 | A1 | 4/2010 | Hugg et al. |
| 2010/0174783 | A1 | 7/2010 | Zarom |
| 2010/0192072 | A1 | 7/2010 | Spataro et al. |
| 2010/0203968 | A1 | 8/2010 | Gill et al. |
| 2010/0205541 | A1 | 8/2010 | Rapaport et al. |
| 2010/0226288 | A1 | 9/2010 | Scott et al. |
| 2011/0055309 | A1 | 3/2011 | Gibor et al. |
| 2011/0106662 | A1 | 5/2011 | Stinchcomb |
| 2011/0107239 | A1 | 5/2011 | Adoni et al. |
| 2011/0185057 | A1 | 7/2011 | Waugaman et al. |
| 2011/0222466 | A1 | 9/2011 | Pance et al. |
| 2011/0269540 | A1 | 11/2011 | Gillo et al. |
| 2011/0271205 | A1 | 11/2011 | Jones et al. |
| 2011/0300841 | A1 | 12/2011 | Archambault et al. |
| 2011/0319175 | A1 | 12/2011 | Jensen |

OTHER PUBLICATIONS

"Ruby on rails—Implementing an Online Waiting Room," [online]. First Accessed on Oct. 7, 2011. Retrieved from the Interne!: http://stackoverflow.com/questions/2669891/implementing-an-online-waiting-room, 2 pg.

"TJN Chat Room—The Jazz Newwork Worldwide," [online]. First Accessed Dec. 5, 2011. Retrieved from the Interne!: http://www.thejazznetworkworldwide.com/group/tjnchatroom, 17 pgs.

Apple, Inc. Using your built-in iSight camera. Nov. 14, 2011. accessed on Aug. 5, 2013 from Internet http;//support.apple.com/kb/ht1462. p. 1-2.

Avchat Video Chat "AVChat Video Chat Features, Tons of Features, Insanely Flexible," [online]. First Accessed Aug. 18, 2011. Retrieved from the Interne!: http://avchal.nel/features.php, 4 pgs.

Parkes, Skype for iPhone will run in the background with iPhone OS 4. Apr. 8, 2010. The Big Blog [online]. Retrieved from the Internet: http://blogs.skype.com/en/2010/04/skype__for__iphone__will__run__in__t.html.

Roseman et al., TeamRooms: Network Places for Collaboration. 1996. ACM , Computer Supported Cooperative Work '96. p. 325-333.

Wikipedia page: Skype™, last modified Jul. 10, 2011, 22 pp.

www.tinychat.com, "Video chat with friends & meet new ones from all around the world—today," downloaded Jul. 11, 2011, 18 pp.

Wikipedia page: Tinychat, last modified Jun. 15, 2011, 2 pp.

Weisz et al., "Watching Together: Integrating Text Chat With Video," CHI 2007 Proceedings—Video, Apr. 28-May 3, 2007, San Jose, CA, pp. 877-886.

ichat: excerpt from http://www.apple.com/macosx/apps/all.htm#ichat, downloaded Jul. 11, 2011, 1 p.

* cited by examiner

2
CLIENT DEVICE 10
COMM. CLIENT 12
COMM. MODULE 14
OUTPUT DEVICE 18
INPUT DEVICE 16
USER 20
GRAPHICAL USER INTERFACE 22
MULTIMEDIA CONTENT 24
26
SERVER DEVICE 28
COMM. SERVER 30
COMM. SESSION 32
34A
34B
34C
CLIENT DEVICE 36A
COMM. CLIENT 38A
CLIENT DEVICE 36B
COMM. CLIENT 38B
CLIENT DEVICE 36C
COMM. CLIENT 38C
USER 40A
USER 40B
USER 40C

VIRTUAL SOCIALIZING

This application claims the benefit of U.S. Provisional Application No. 61/497,923, filed Jun. 16, 2011, which is hereby incorporated by reference in its entirety.

TECHNICAL FIELD

This disclosure relates to electronic devices, and, in particular, virtual socializing between electronic devices.

BACKGROUND

A user may socialize with his/her contacts by chatting, watching television or videos, playing games, or engaging in other activities with his/her contacts. In some instances, a user and his/her contacts may not be in the same physical location. Instead, the user and his/her contacts may rely on other mechanisms to socialize, such as talking on the phone, sending email, or text messaging.

SUMMARY

In one example, a method includes joining, by a first computing device having at least one processor, a communication session managed by a server device, where the communication session enables communication between the first computing device and a second computing device, where the second computing device is communicatively coupled to the first computing device using the communication session, and where the first computing device and the second computing device are each one or two or more computing devices communicatively coupled via the communication session. In some examples, the method includes outputting, by the first computing device, multimedia content, where the multimedia is also output at the second computing device. In some examples, the method includes, while the multimedia content is outputting at the first output device, receiving, by the first computing device, data from the second computing device, where the data comprises data captured by an input device of the second computing device, and outputting, by the first computing device, the data received from the second computing device. In some examples, the method further includes sending, by the first computing device, a configuration request to the server device that sets a control model mode of the communication session, where the control model mode controls which one or more computing devices of the two or more computing devices communicatively coupled via the communication session has permission to modify at least the multimedia content output at the two or more computing devices.

In one example, a non-transient computer-readable storage medium is encoded with instructions that cause one or more processors to join, by a first computing device having at least one processor, a communication session managed by a server device, where the communication session enables communication between the first computing device and the second computing device, where the second computing device is communicatively coupled to the first computing device using the communication session, and where the first computing device and the second computing device are each one or two or more computing devices communicatively coupled via the communication session. In some examples, the instructions further cause the processors to output, by the first computing device, multimedia content, where the multimedia content is also output at the second computing device. In some examples, the instructions further cause the processors to, while the multimedia content is outputting at the first output device, receive, by the first computing device, data from the second computing device, where the data comprises data captured by an input device of the second computing device, and output, by the first computing device, the data received from the second computing device. In some examples, the instructions further cause the processors to send, by the first computing device, a configuration request to the server device that sets a control model mode of the communication session, where the control model mode controls which one or more computing devices of the two or more computing devices communicatively coupled via the communication session has permission to modify at least the multimedia content output at the two or more computing devices.

In yet another example, a computing device comprising one or more processors, the one or more processors being configured to perform a method. In some examples, the method includes joining a communication session managed by a server device. The communication session may enable communication between the computing device and a second computing device, where the second computing device is communicatively coupled to the computing device using the communication session, and where the computing device and the second computing device are each one or two or more computing devices communicatively coupled via the communication session. In some examples, the method includes outputting multimedia content, where the multimedia content is also output at the second computing device. In some examples, the method includes receiving, while the computing device outputs the multimedia content, data from the second computing device using the communication session, where the data comprises data captured by an input device of the second computing device. In some examples, the method includes outputting the data received from the second computing device and sending a configuration request to the server device to set a control model mode of the communication session. The control model mode may control which one or more computing devices of the two or more computing devices communicatively coupled via the communication session has permission to modify at least the multimedia content output at the two or more computing devices.

In another example, a method, executed on one or more computing devices, includes joining a server comprising one or more computing devices, the one or more computing devices being configured to perform a method. In some examples, the method includes coupling, by the one or more computing devices, a first computing device associated with a first user and a second computing device associated with a second user to a communication session managed by the one or more computing devices. The communication session enables communication between the first computing device and a second computing device, and the first computing device and the second computing device are each one or two or more computing devices communicatively coupled via the communication session. In some examples, the method includes, while multimedia content is output at the first computing device and the second computing device, receiving, by the one or more computing devices, first data from the first computing device and second data from the second computing device, where the first data comprises first data captured by a first input device associated with the first computing device, and where the second data comprises second data captured by a second input device associated with the second computing device. In some examples, the method includes sending, by the one or more computing devices, the first data to the second computing device and the second data to the first computing device. In some examples, the method includes receiving, by the one or more computing devices, a configuration request to set a control model mode of the communication session, wherein the control model mode controls which one or more computing devices of the two or more computing devices communicatively coupled via the communication session has permission to modify at least the multimedia content output at the two or more computing devices.

In another example, a server comprising one or more computing devices, the one or more computing devices being configured to perform a method. In some examples, the method includes coupling, by the one or more computing devices, a first computing device associated with a first user and a second computing device associated with a second user to a communication session managed by the one or more computing devices. The communication session enables communication between the first computing device and a second computing device, and where the first computing device and the second computing device are each one or two or more computing devices communicatively coupled via the communication session. In some examples, the method includes while multimedia content is output at the first computing device and the second computing device, receiving, by the one or more computing devices, first data from the first computing device and second data from the second computing device. The first data comprises first data captured by a first input device associated with the first computing device, and where the second data comprises second data captured by a second input device associated with the second computing device. In some examples, the method includes sending, by the one or more computing devices, the first data to the second computing device and the second data to the first computing device. In some examples, the method includes receiving, by the one or more computing devices, a configuration request to set a control model mode of the communication session, wherein the control model mode controls which one or more computing devices of the two or more computing devices communicatively coupled via the communication session has permission to modify at least the multimedia content output at the two or more computing devices.

The details of one or more embodiments are set forth in the accompanying drawings and the description below. Other features, objects, and advantages will be apparent from the description and drawings, and from the claims.

BRIEF DESCRIPTION OF DRAWINGS

In accordance with common practice, the various described features are not drawn to scale and are drawn to emphasize one or more features relevant to the present application. Like reference characters denote like elements throughout the figures and text.

DETAILED DESCRIPTION

Overview

Figure 1:
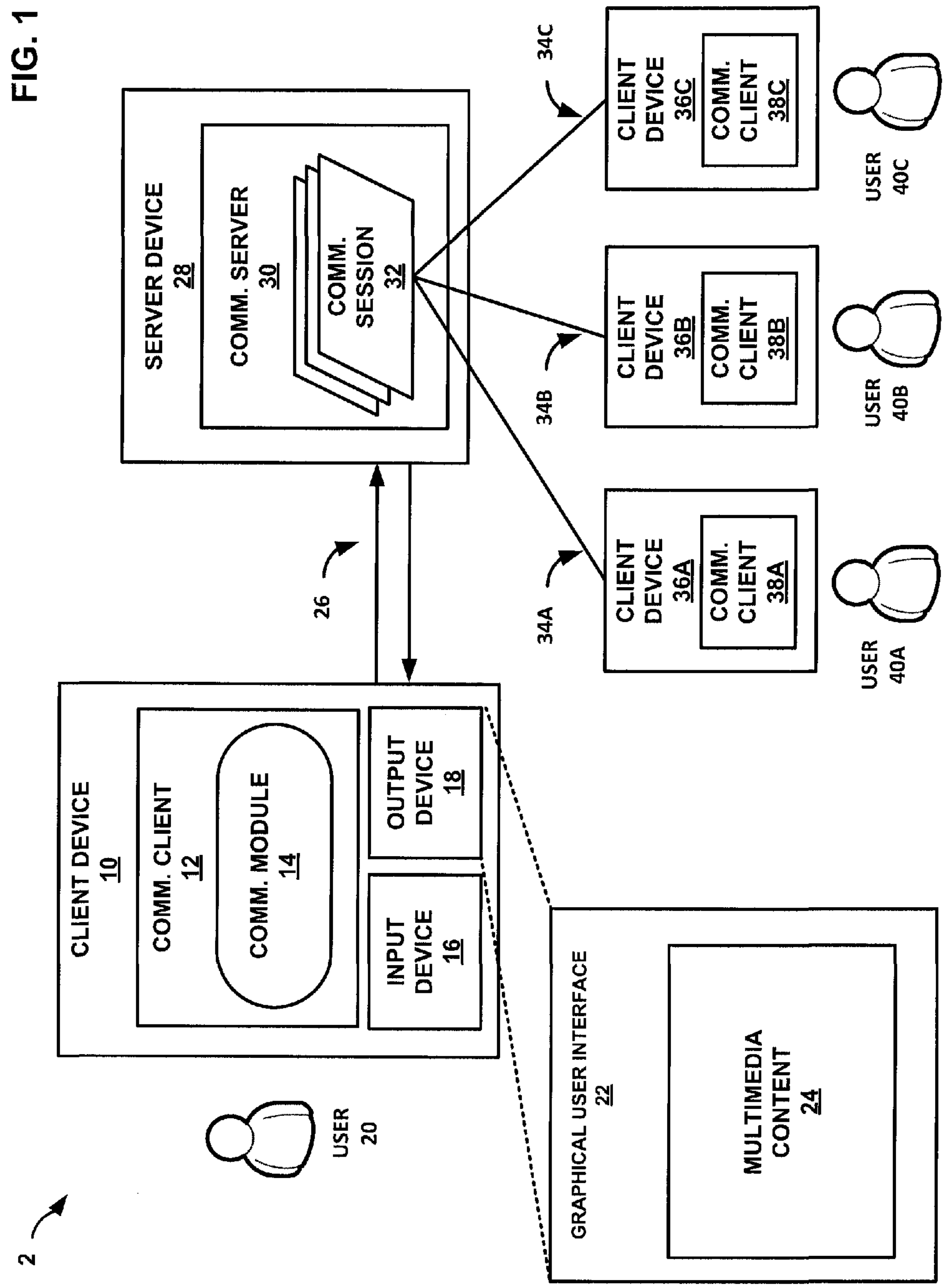
FIG. 1 is a block diagram illustrating an example of a communication system in which one or more client devices communicatively coupled to a communication session enables communication between users, in accordance with one or more aspects of the present disclosure.

Watching videos is often a social experience in which participants use a single device at a single location (e.g., a television) to watch multimedia content. While watching the content, viewers may socially interact in response to the multimedia content. For example, users may discuss the multimedia content with other users as the multimedia content is viewed when the users are in physical proximity to one another. In the information age, users may be dispersed geographically and may therefore watch videos from different locations on different devices. As a result, viewers may be unable to contemporaneously watch multimedia in physical proximity to one another and socially interact with other viewers in response to the multimedia content, which may not provide individuals with an experience similar to actually socializing in person.

Techniques of the present disclosure may provide one or more mechanisms for users in different locations to socialize in a shared virtual location (e.g., engage in a "virtual collaboration session"). A virtual collaboration session may enable multiple users to share and watch videos, share and listen to audio streams, play games, participate in video and/or audio chat, collaboratively browse the Internet, or combinations thereof.

In one aspect of the present disclosure, the virtual collaboration session may be provided using a communication session. The term "communication session" as used herein is a broad term encompassing as its plain and ordinary meaning, including but not limited to, one or more objects, which may be stored in and/or are executable by hardware that may enable communication clients coupled to the one or more objects to exchange information. The one or more objects may include data and/or provide functionality of a communication session as described herein.

Users of a communication session may contemporaneously watch videos, communicate, and play games with the other users of the communications session. Additionally, aspects of the present disclosure allow users of a communication session to have simultaneous control of the multimedia content. That is, each user of the communication session may modify the multimedia content and the modification will occur on each client device outputting the multimedia content. For example, a user may provide input to rewind a video outputting to the users of the communication session. In response to the input to rewind, the video will simultaneously rewind on each client device coupled to the communication session.

Further aspects of the present disclosure enable users to receive audio and/or visual expressions of other users participating in the communication session while watching and/or listening to the multimedia content. In one example, a user may initiate a communication session using a communication client executing on a computing device. A user may further invite one or more other users to join the communication session. Using a communication client, one of the users may select multimedia content (e.g., a video), which is further displayed to each of the users coupled to the communication session.

The communication client, in addition to displaying the multimedia content, may further provide video and/or audio feeds of other users watching the video. The video and/or audio feeds may include the video data and audio data, respectively. Thus, when one user reacts to the multimedia content, the other users in the communication session may see and hear the reaction the user. Aspects of the present disclosure may improve social interaction because reactions of users are received by other users as the reactions occur in response to the multimedia content. In addition, the richness of the communicated reactions (e.g., video or audio data) may further improve the social interaction because such data may convey more information with less user effort.

As used throughout this disclosure, headings are included to improve the clarity of the disclosure and are not used to define separate embodiments. In some examples, features of various embodiments may be combined and/or used from among multiple headings in accordance with aspects of the present disclosure.

Example System

FIG. 1 is a block diagram illustrating an example of a communication system 2 in which one or more client devices are coupled to a communication session that enables communication between users, in accordance with one or more aspects of the present disclosure. Examples of client devices 10 and 36A-C (e.g., computing devices), may include, but are not limited to, portable or mobile devices such as mobile phones (including smart phones), laptop computers, personal digital assistants (PDAs), portable gaming devices, portable media players, televisions with one or more processors embedded therein or attached thereto, and e-book readers. Client devices 10 and each of client devices 36A-C may be the same or different types of devices. For example, client device 10 and client device 36A may both be mobile phones. In another example, client device 10 may be a mobile phone and client device 36A may be a desktop computer.

As illustrated in FIG. 1, client device 10 may communicate with server device 28 via a communication channel 26. Server device 28 may include a communication server 30 that maintains one or more communication sessions such as communication session 32. Various components described in FIG. 1 may include similar properties and characteristics as described throughout this disclosure.

Client device 10 of FIG. 1 may include a communication client 12, input device 16 and output device 18. Communication client 12 may further include a communication module 14 that causes output device 18 to display a graphical user interface (GUI) 22. GUI 22 may further include multimedia content 24. Communication module 14 may include functionality that enables communication client 12 to connect to communication server 30 and join one or more communication sessions 32. Two or more client devices (e.g., client device 10 and client device 36A) may join the same communication session 32 to enable communication between the client devices. As described throughout this disclosure, a user may "join" a communication session when the communication client of the user's computing device couples, e.g., establishes a connection, to a communication server executing on a server device and/or client device. In some examples, a communication client executing on a computing device joins a communication session by coupling to a communication session managed by a communication server executing on a server device and/or client device.

In some examples, communication module 14 may further include functionality that enables communication client 14 to send an initiation request to server device 28 to create (e.g., initiate) one or more communication sessions 32. For example, the client device 10 may send, via the communication client 14, an initiation request to the server device 28 to create communication session 32. Server device 28 may automatically join client device 10 to the communication session 32 in response to receiving the initiation request. In other examples, once the server device 28 receives the initiation request to create the communication session 32 from, for example, client device 10, client device 10 may select to join the communication session 32.

As shown in FIG. 1, communication clients 38A-C may enable users 40A-C to join one or more communication sessions 32 created by user 20. Each of communication clients 38A-C executing on client devices 36A-C may include the same or similar functionality as communication client 12. As shown in FIG. 1, each of communication clients 38A-C may each participate in communication session 32 via network connections 34A-C.

Communication client 12 and communication server 30 may exchange audio, video, text, or other information. The information exchanged between communication client 12 and communication server 30 may be optimized based, at least in part, on the hardware and/or software capabilities of client device 10. For example, if client device 10 is a mobile device with relatively lower bandwidth and computing resource capabilities, communication server 30 may optimize the number and quality of the audio and/or video feeds sent to client device 10. Furthermore, communication client 12 may dynamically adjust the bit rate required to send the information to communication server 30 by, for example, reducing the quality of the audio and/or video feed being sent to communication server 30.

In the example of FIG. 1, users 20 and 40A-C may initially cause communication clients 12 and 38A-C to join communication session 32. Communication session 32 may provide audio and video feeds of each user participating in the session, which may be displayed by communication clients 12 and 38A-C. Each audio and video feed may provide a sound (e.g., audio data) and graphical representation (e.g., video data) of a user participating in communication session 32. In addition to displaying audio and video feeds of each user participating in communication session 32, communication clients 12 and 38A-C may display multimedia content. For instance, communication module 14 may cause output device 18 to display GUI 22, which further includes multimedia content 24.

In some examples, multimedia content 24 may include one or more images, animations, videos, or other graphical representation. In other examples, multimedia content 24 may include sound, voice, or other audio representation. In still other examples, multimedia content 24 may include a combination of graphical representations and audio representations. Additionally, multimedia content 24 may include animations of a game executing on client device 10 and played by user 20. The game may be a multi-player game such that users 40A-C also participate via communication session 32.

In the example of FIG. 1, multimedia content 24 may be output by each client device 10 and 36A-C contemporaneously using communication clients 12 and 38A-C. In this way, each user 20 and 40A-C may view multimedia content 24. In some examples, multimedia content 24 may be selected by user 20 using communication client 12. In other examples, users 40A-C may select multimedia content that will be output contemporaneously at each computing device connected to communication session 32. In one example, once multimedia content is selected by a user participating in the communication session 32, each communication client may separately retrieve the selected multimedia content. For example, if user 20 selects a video to play, communication client 12 may send a multimedia command to communication clients 38A-C to retrieve the video and output the video on client devices 36A-C. In other examples, if user 20 selects a video, communication client 12 may retrieve and send the video to server device 28, which may then send the video to communication clients 38A-C.

As shown in FIG. 1, client device 10 may include one or more input devices 16 such as a microphone and/or a camera. In some examples, a microphone may generate audio data that includes a representation of an audio expression of a user. For example, the microphone may generate audio data that represents words or audible sounds spoken by a user. In some examples, a video camera may generate video data that includes a representation of a visual expression of a user. For example, the camera may generate video data that represents facial expressions, gestures or other motions of a user. In some examples, a camera may generate an image and/or a group of moving images.

Communication module 14 may receive audio data and video data from one or more input devices 16 such as a microphone and camera. For instance, in one example, user 20 may change her/his facial expression and further speak one or more words. A microphone and camera included in client device 10 may each generate audio data and video data, respectively, which include representations of the change in facial expression and spoken words of user 20. Communication module 14 may receive the audio and video data from the microphone and camera.

When communication module 14 receives audio and video data from input devices 16 while multimedia content 24 is outputting at each client device, communication module 14 may further send the audio and video data to server device 28. Communication server 30 may the send the audio and video data to each client device 36A-C because each of communication clients 38A-C are connected to communication session 32. Alternatively, communication module 14 may send audio and video data directly to client devices 36A-C. Each of communication clients 38A-C may each receive the audio and video data, which may be output by output devices on each client device 36A-C. For example, audio data may be output by a speaker and/or sound card of each computing device and video data may be output by a graphics card and monitor of each computing device. In this way, audio and video data of users in response to viewing multimedia content 24 may be provided to each user participating in communication session 32. Consequently, users may see and hear reactions of other users participating in the communication session contemporaneously with multimedia content 24.

Client device 10 may communicate with server device 28 via the communication channel 26. Server device 28 may include a communication server 30 that maintains one or more communication sessions such as communication session 32. Client device 10 of FIG. 1 may receive a configuration request via the input device 16 indicating a control model mode of the communication session 32. Client device 10 may, in response to receiving the configuration request, send the configuration request to the service device 28 managing the communication session 32 to set the control model mode of the communication session 32. The control model mode of the communication session 32 may be one of an asymmetric control model or a symmetric control model mode, discussed herein.

The control model mode of the communication session 32 may control which user or users participating in the communication session 32 have authority to modify aspects of the communication session 32. In the asymmetric control model or "strong controller" model, one or a subset of the users of the communication session 32 have the authority to modify aspects of the communication session 32. For example, user 20 may be designated as the strong controller and is the only user in the communication session 32 that has authority to modify aspects of the communications session 32. In the symmetric control model, all users participating in the communication session 32 have equal authority to modify aspects of the communication session 32.

The control model mode of the communication session 32 enables one or more users to simultaneously control the multimedia content 24 outputting at the client devices coupled to the communications session 32. As discussed herein, user 20 may select a video to play within the communication session 32. Once the video is selected, each communication client of the client devices coupled to the communication session may retrieve the video and output the video on the respective client device. The multimedia content outputting on each client device (e.g., client devices 10 and 36A-C) may be simultaneously controlled by users of client devices coupled to the communication session 32. That is, each user viewing the multimedia content may modify the multimedia content outputting on all client devices coupled to the communication session 32. Modifying the multimedia content may include changing the playback of the multimedia content. For example, changing the playback of the multimedia content may include fast forwarding, rewinding, slow motion fast forwarding, slow motion rewinding, and pausing. Additionally, modifying the multimedia content may include changes occurring while playing a game. For example, if a user moves a game piece in a game, the change may occur on each client device outputting the game as the multimedia content.

In one example, if user 20 provides an input to modify the multimedia content outputting on client device 10, communication client 12 may generate a control message including the change in the multimedia content and send the control message to server device 28 managing the communication session 32. Server device 28 may then send the control message to communication clients 38A-C. Communication clients 38A-C may modify the multimedia content outputting on client devices 36A-C according to the change in the multimedia content provided by user 20. In other words, a user may provide an input to modify the multimedia content and each communication client coupled to the communication session may receive a control message indicating a change to the multimedia content and independently modify the multimedia content outputting at the respective client device. Therefore, each communication client may separately retrieve the multimedia content, but the control of the multimedia content may be simultaneously controlled by each user of a client device coupled to the communication session.

Various aspects of the present disclosure may provide one or more advantages. For example, techniques of the present disclosure provide a shared social context that enables users in a communication session to share and receive reactions to multimedia content mutually viewed by the users. Aspects of the present disclosure overcome problems physical remoteness when users are geographically dispersed by providing audio data and/or video data of users in response to multimedia content.

Example Device

Figure 2:
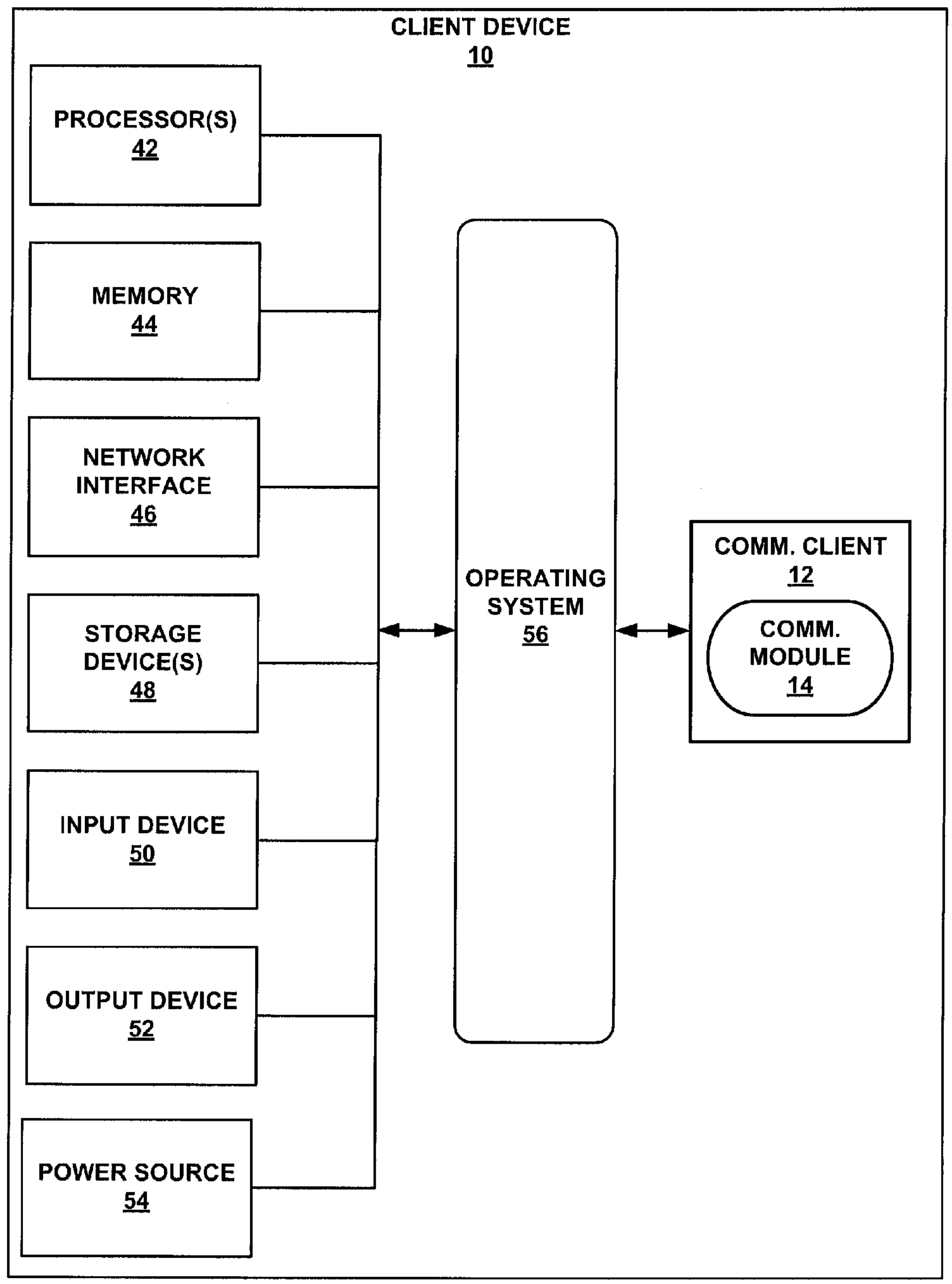
FIG. 2 is a block diagram illustrating an example of a computing device configured to create a communication session that enables communication between users, in accordance with one or more aspects of the present disclosure.

FIG. 2 is a block diagram illustrating one example of a computing device configured to create a communication session that enables communication between users, in accordance with one or more aspects of the present disclosure. FIG. 2 illustrates further details of one example of client device 10 (e.g., computing device) shown in FIG. 1. FIG. 2 illustrates only one particular example of client device 10, and many other example embodiments of client device 10 may be used in other instances.

As shown in the specific example of FIG. 2, client device 10 includes one or more processors 42, memory 44, a network interface 46, one or more storage devices 48, input device 50, output device 52, and power source 54. Client device 10 also includes an operating system 56 that is executable by client device 10. Client device 10, in one example, further includes communication client 12 that is also executable by client device 10. Each of components 42, 44, 46, 48, 50, 52, 54, 56 and 12 may be interconnected (physically, communicatively, and/or operatively) for inter-component communications.

Processors 42, in one example, are configured to implement functionality and/or process instructions for execution within client device 10. For example, processors 42 may be capable of processing instructions stored in memory 44 or instructions stored on storage devices 48.

Memory 44, in one example, is configured to store information within computing device 10 during operation. Memory 44, in some examples, is described as a computer-readable storage medium. In some examples, memory 44 is a temporary memory, meaning that a primary purpose of memory 44 is not long-term storage. Memory 44, in some examples, is described as a volatile memory, meaning that memory 44 does not maintain stored contents when the computer is turned off. Examples of volatile memories include random access memories (RAM), dynamic random access memories (DRAM), static random access memories (SRAM), and other forms of volatile memories known in the art. In some examples, memory 44 is used to store program instructions for execution by processors 42. Memory 44, in one example, is used by software or applications running on client device 10 to temporarily store information during program execution.

Storage devices 48, in some examples, also include one or more computer-readable storage media. Storage devices 48 may be configured to store larger amounts of information than memory 44. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 10, in some examples, also includes a network interface 46. Client device 10, in one example, utilizes network interface 46 to communicate with external devices via one or more networks, such as one or more wireless networks. Network interface 46 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, client device 10 utilizes network interface 46 to wirelessly communicate with an external device such as server device 28 of FIG. 1, a mobile phone, or other networked computing device.

Client device 10, in one example, also includes one or more input devices 50. Input device 50, in some examples, is configured to receive input from a user through tactile, audio, or video feedback. Examples of input device 50 include a presence-sensitive screen, a mouse, a keyboard, a voice responsive system, video camera, microphone or any other type of device for detecting a command from a user. In some examples, a presence-sensitive screen includes a touch-sensitive screen. In other examples, input device 50 can receive a configuration request indicating the control model mode of the communication session.

One or more output devices 52 may also be included in client device 10. Output device 52, in some examples, is configured to provide output to a user using tactile, audio, or video stimuli. Output device 52, in one example, includes a presence-sensitive screen, a sound card, a video graphics adapter card, or any other type of device for converting a signal into an appropriate form understandable to humans or machines. Additional examples of output device 52 include a speaker, a cathode ray tube (CRT) monitor, a liquid crystal display (LCD), or any other type of device that can generate intelligible output to a user.

Client device 10, in some examples, may include one or more power sources 54, which may be rechargeable and provide power to client device 10. Power source 54, in some examples, is made from nickel-cadmium, lithium-ion, or other suitable material.

Client device 10 may include operating system 56. Operating system 56, in some examples, controls the operation of components of client device 10. For example, operating system 56, in one example, facilitates the interaction of communication client 12 with processors 42, memory 44, network interface 46, storage device 48, input device 50, output device 52, and power source 54. As shown in FIG. 2, communication client 12 may include communication module 14 as described in FIG. 1. Communication client 12 and communication module 14 may each include program instructions and/or data that are executable by client device 10. For example, communication module 14 may include instructions that cause communication client 12 executing on client device 10 to perform one or more of the operations and actions described in the present disclosure.

In some examples, communication client 12 and/or communication module 14 may be a part of operating system 56 executing on client device 10. In some examples, communication client 12 may receive input from one or more input devices 50 of computing device 10. Communication client 12 may, for example, receive audio or video information associated with a communication session from other computing devices participating in the communication session. In some examples, the communication client 12 and/or communication module 14 may receive the configuration request and set the control model mode of the communication session to one of the asymmetric control model or symmetric the control model based on at least the configuration request.

Example Interface

Figure 3:
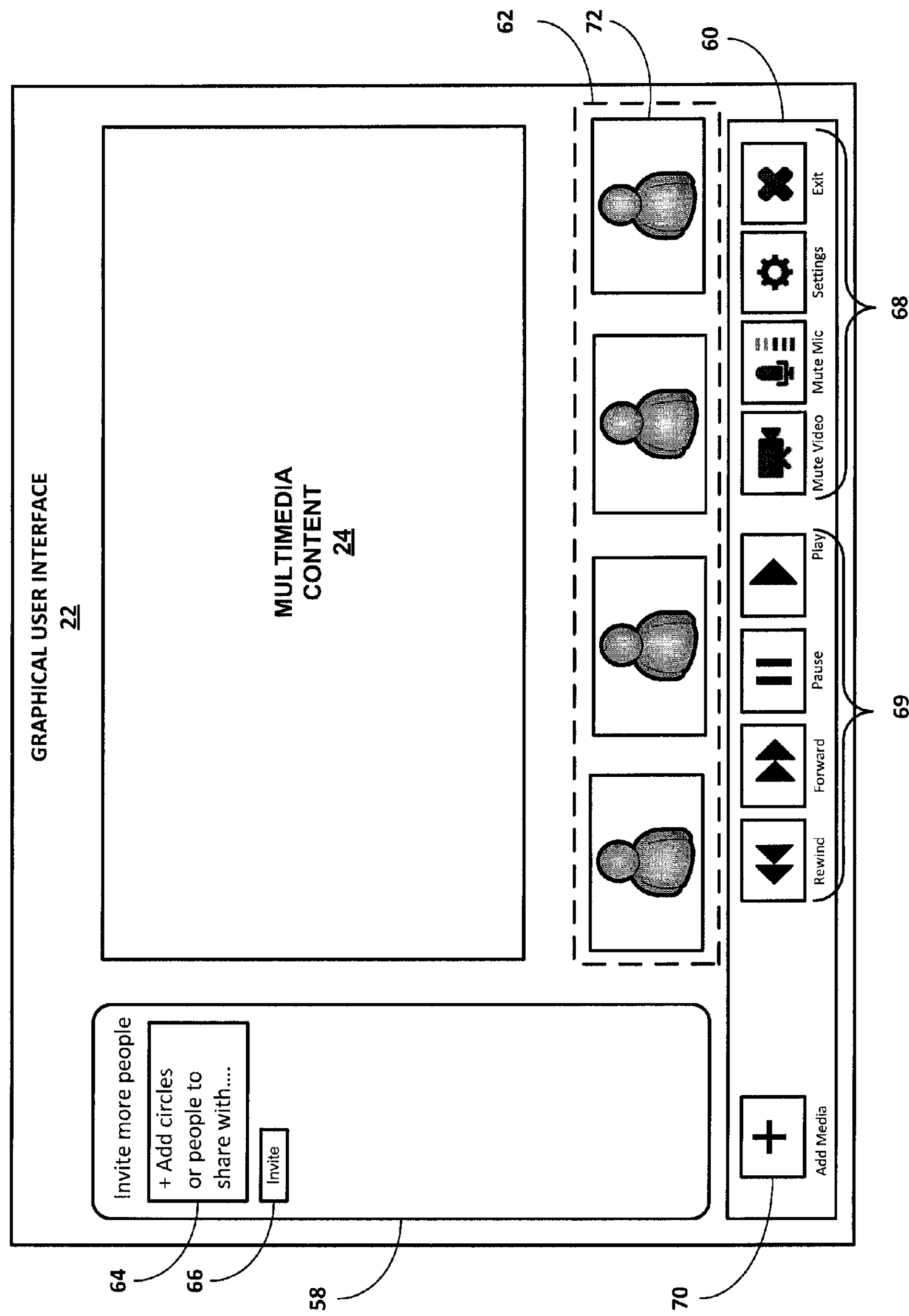
FIG. 3 is a block diagram illustrating an example of a graphical user interface that displays multimedia content and data including at least one of audio data and video data of a user, in accordance with one or more aspects of the present disclosure.

FIG. 3 is a block diagram illustrating an example of a graphical user interface that displays multimedia content and data including at least one of audio data and video data of a user, in accordance with one or more aspects of the present disclosure. FIG. 3 includes GUI 22 of FIG. 1 generated by communication module 14 executing on client device 10. As shown in FIG. 3, GUI 22 includes multimedia content 24, invitation panel 58, control panel 60, and user panel 62.

Multimedia content 24 may include animations of a game (e.g., a video game) executing on computing device 10 of FIG. 1 and played by user 20. The game may be a multi-player game that users 40A-C may also participate in via communication session 32. In one example where multimedia content 24 includes animation of a game, user 40A may provide an input modifying the multimedia content such as moving a piece in a game. The multimedia content 24 outputting to user 20 via GUI 22 may be modified according to the modification provided by user 40A As shown in FIG. 3, GUI 22 may include invitation panel 58. Invitation panel 58 may enable user 20 to invite other users to join communication session 32 and participate in the video game. For example, user 20 may send an initiation request to the server device 28 to create the communication session 32 and invite other users (e.g., users 40A-C) to join the communication session 32. Server device 28 may automatically join client device 10 to the communication session 32. In other examples, client device 10 may select to join the communication session 32 once the server device 28 has created the communication session 32 in response to receiving the initiation request. Invitation panel 58 may include a control button 64 that enables a user to invite other users. For instance, when user 20 selects control button 64, communication module 14 may cause GUI 22 to display identifiers of one or more users or groups of users that user 20 may select for invitation to communication session 32. After user 20 has selected one or more users, user 20 may further select control button 66. In some examples, GUI 22 may include control button 66 that, when selected by user 20, causes communication module 14 to send invitations to the selected users to join communication session 32.

GUI 22 may further include control panel 60. Control panel 60 may include one or more control buttons 68 and modification buttons 69. Control buttons 68 may enable user 20 to control functions of communication client 12 and client device 10. For instance, control buttons 68 may be associated with various functions that may be performed by communications module 14. Various functions may include muting a video camera attached to client device 10, muting a microphone of client device 10, accessing user specified settings of communication client 12, and/or exiting communication session 32. At some point during the communication session, users 20 and 40A-C may have a distraction (e.g., a telephone call). Users 20 and 40A-C can use the various functions on control panel 60 such as muting the video camera or muting the microphone to mute the video and/or audio feed to tend to any distractions without disturbing the social interaction of the other users participating in the communication session.

In some examples, users can use the control panel 60 to change the information that is displayed in the GUI 22. For example, user 20 may access settings of the communication session 32 via the control panel 60 and provide user input to change user specified settings. For example, user 20 can access the specified settings of the communication session 32 via the GUI 22 to specify which information is displayed on the GUI 22. As seen in FIG. 3, the GUI 22 includes the multimedia content 24, invitation panel 58, control panel 60, and user panel 62. In some examples, the GUI 22 can include less information than is provided in GUI 22 as illustrated in FIG. 3. In other examples, the GUI 22 can include more information than is provided in GUI 22 as illustrated in FIG. 3. For example, user 20 can change the specified settings such that, for example, the invitation panel 58 is removed from the GUI 22. User 20 may remove the invitation panel 58 from the GUI 22, for example, once all users (e.g., 40A-C) that user 20 would like to socialize with have been sent an invitation or have joined the communication session 32. Additionally, user 20 may want to view the multimedia content 24 as a full screen and thus can remove, for example, the user panel 62. Removing the user panel 62 may allow the multimedia content 24 to be viewed in an enlarged state. In that instance, user 20 may still hear the audible reactions of users 40A-C, whereas the video feeds of users 40A-C may be removed from the GUI 22.

In some examples, the user creating the communication session 32 may adjust security settings of the communication session via the control buttons 68 of control panel 60. In some examples, the settings button may be selected to adjust the security setting to determine which users can join the communication session 32. In one example, user 20 may set the security setting to allow only users that were sent invitations to join the communication session 32. For instance, user 20 can generate a control message that indicates users having received an invitation may join the communication session 32. In some examples, users that have not been sent an invitation from user 20 will not be able to join the communication session 32. In other examples, the communication session 32 may be open for all users to join. That is, in various instances, users 40A-C may join the communication session 32 regardless of whether user 20 has sent users 40A-C an invitation. Therefore, a user interested in socializing can start and/or join a communication session and adjust security settings such that other known and/or unknown users can join the communication session to socialize.

In other examples, the settings button on control panel 60 may be used to set the control model mode for the communication session. For example, user 20 may enter a configuration request via the settings button to set the control model mode of the communication session 32. The configuration request can indicate whether the control model mode of the communication session 32 is the asymmetric control model or the symmetric control model. In one example, the client device 10 may receive the configuration request selecting the asymmetric control model as the control model mode. In the asymmetric control model mode, for example, user 20 may be the single strong-controller user and may modify aspects of the communication session 32. In other examples, user 20 may delegate strong-controller authority to, for example, user 40A thus allowing user 40A to have the same or similar authority as user 20 to modify aspects of the communication session 32.

In other examples, the client device 10 may receive the configuration request selecting the symmetric control model as the control model mode. In the symmetric control model mode, for example, users 20 and 40A-C may all have the same authority to modify aspects of the communications session 32.

Control panel 60 may include modification buttons 69 that may enable user 20 to modify the multimedia content 24. For instance, modification buttons 69 may be associated with various modifications of the multimedia content 24. In some examples, modifications may include, but are not limited to, rewinding, forwarding, pausing, and playing the multimedia content. For example, at some point during the communication session, user 20 may wish to pause the multimedia content 24 and may provide an input selecting the "Pause" modification button 69 of control panel 60. Responsive to receiving the input, communication module 14 may generate a control message indicating the change of the multimedia content. Communication module 14 may send the control message to communication server 32 that may send the control message to the other client devices coupled to communication session 32 indicating the change of the multimedia content. Therefore, users 20 and 40A-C can select the various modification buttons 69 on control panel 60 to enable simultaneous control of multimedia content 24.

Control panel 60 may further include control button 70 that when selected enables user 20 to select multimedia content that may be contemporaneously output at each client device participating in the communication session. For example, when user 20 selects control button 70, module 14 may cause GUI 22 to display a group of one or more identifiers that each identify different multimedia content. For instance, the one or more identifiers may each correspond to one or more videos that user 20 may select. In other examples, one or more identifiers may correspond to one or more images. In still other examples, an identifier may correspond to one or more games that may be played by one or more users participating in communication session 32. User 20 may provide user input via GUI 22 that causes communication module 14 to select one or more identifiers each associated with different multimedia content. Communication module 14 may subsequently select the multimedia content associated with the one or selected identifiers to be output by client device 10. The selected multimedia content may then be output by client device 10.

The various functions provided in control panel 60 can be changed by user 20 prior to joining the communication session 32, while the multimedia content 24 is being output during the communication session 32, or after the communication session 32 has ended.

In some examples, GUI 22 includes user panel 62. User panel 62 may include one or more video feeds 72. Video feed 72 may be a video feed received from another user participating in communication session 32. Video feed 72 may include a representation of a visual expression of a user participating in communication session 32. For instance, a camera of a client device 40A may generate video data representing visual expressions of user 40A. The video data may be sent by client device 36A to client device 10. Communication module 14 may display the video data in video feed 72. In this way, user 20 may see user 40A's visual expressions when viewing multimedia content 24. In the current example, communication module 14 may also receive audio data that includes user 40A's audio expression when viewing multimedia content 24.

Aspects of the present disclosure further include techniques to modify an audio level (e.g., a volume level) of audio data that includes a representation of an audio expression of a user. The audio level may be modified to enable users to better hear comments of other users using the communication session. For example, as users 20 and 40A-C are watching multimedia content 24, user 40C may provide a spoken comment with respect to multimedia content 24. Audio data that includes a representation of the comment may be sent to client devices 10 and 36A-B of users 20 and 40A-B participating in communication session 32. Each client device that receives the audio data may generate a sound signal via one or more output devices such as a sound card and/or speakers based on the audio data that includes a representation of the comment. In some examples, a user (e.g., user 20) may have difficulty hearing other users' reactions while sounds of multimedia content 24 are also output by client device 10.

Techniques of the present disclosure may, in some examples, modify an audio level of multimedia content 24 to enable user 20 to better hear sounds generated from audio data that include representations of audio expressions of (e.g., user 40C). For instance, when user 40C provides a spoken comment on multimedia content 24, communication client 38C may generate audio data that includes a representation of the comment. The audio data may be sent by communication client 38C to each of communication clients 36A-B and 12 either directly or via communication server 30.

In response to receiving the audio data, communication module 14 of client device 10 may determine the audio data is from user 40C. For instance, an identifier may be included with the audio data that identifies user 40C, client device 36C, and/or communication client 36C. Examples of such an identifier may include a unique user identifier or Internet Protocol (IP) address. More generally, any suitable identifier may be included with the audio data to determine the audio data is received from user 40C.

Upon determining the audio data is from user 40C, communication module 14 may reduce an audio level of multimedia content 24. For example, known techniques may be applied to data that comprises multimedia content 24 thereby lowering the audio level of multimedia content 24. Upon lowering the audio level of multimedia content 24, communication module 14 may cause output device 18 (e.g., a speaker and/or soundcard) to output multimedia content 24 as an audio signal to user 20. Because the audio level of multimedia content 24 has been lowered by communication module 14, user 20 is better able to hear the comment of user 40C.

In some examples, communication module 14 may alternatively increase an audio level of the audio data that includes a representation of users 40C's comment. That is, the audio level of the comment of user 40C is greater than the audio level of the multimedia content 24. In other examples, communication client 38C may detect when user 40C provides an audio expression (e.g., using known echo-cancellation techniques). Upon detecting user 40C has provided an audio expression, communication client 38C may send a control message to other communication clients connected to communication session 32. The control message may indicate that audio data received from client device 36C includes an audio expression of user 40C. Upon receiving the control message, communication module 14 may decrease a volume audio level of the audio data received from client device 36C. In other examples, communication client 38C may generate the control message in response to user 40C providing a user input (e.g., a key press) at client device 36C. In one example, user 40C may press and hold a key as he or she speaks and later releases the key when finished speaking. In this way, the key press may comprise a user input that generates a control message that indicates audio data is from user 40C. In still other examples, communication server 30 may, in response to receiving the control message, modify an audio level of the audio data received from client device 36C and further send the modified audio data to client devices 10 and 36A-B.

Example Method

Figure 4:
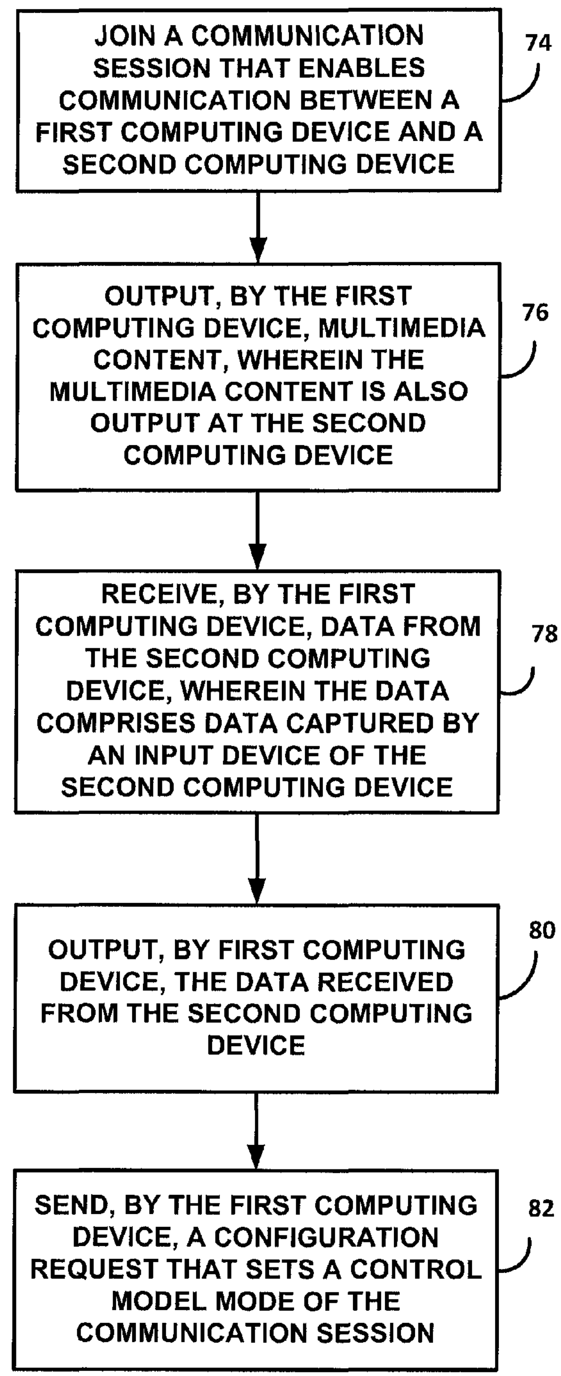
FIG. 4 is a flow diagram illustrating an example method for outputting multimedia content of communication session and receiving data, while the multimedia content is outputting, that includes at least one of audio data and video data of a user in accordance with one or more aspects of the present disclosure.

FIG. 4 is a flow diagram illustrating an example method for outputting multimedia content of communication session and receiving data, while the multimedia content is outputting, that includes at least one of audio data and video data of a user in accordance with one or more aspects of the present disclosure. For purposes of illustration only, the example method is described below within the context of communication system 2 of FIG. 1 and client device 10 of FIG. 2.

In one example, user 20 may initially provide user input at communication client 12 to join communication session 32, the communication session managed by the server device 28. Upon receiving the request, communication module 14 may cause communication client 12 to join the session 32 (74). Communication session 32 enables communication between a first computing device and a second computing device (i.e. client device 10 and 36A). Once communication client 12 has joined communication session 22, communication client 12 may further output multimedia content 24 that is contemporaneously outputting at the second computing device (76). For instance, output device 18 of communication client 12 may display a video that is contemporaneously outputting on computing devices 36A-C.

In the example method of FIG. 4, communication client 12 may, while contemporaneously outputting multimedia content multimedia content 24, receive data from the second computing device using the communication session 32 (78). The data may be captured by an input device of the second computing device. Upon receiving the data, client device 10 may output the data received from the second computing device (80).

In the example method of FIG. 4, user 20 may initially provide a configuration request indicating a control model mode of the communication session 32. Upon receiving the configuration request, client device 10 may send the configuration request to the server device 28 that sets the control model mode of the communication session 32 (82). In some examples, the control model mode controls which one or more computing devices of the computing devices communicatively coupled via the communication session can modify the multimedia content output at the computing devices.

Example Interface

Figure 5:
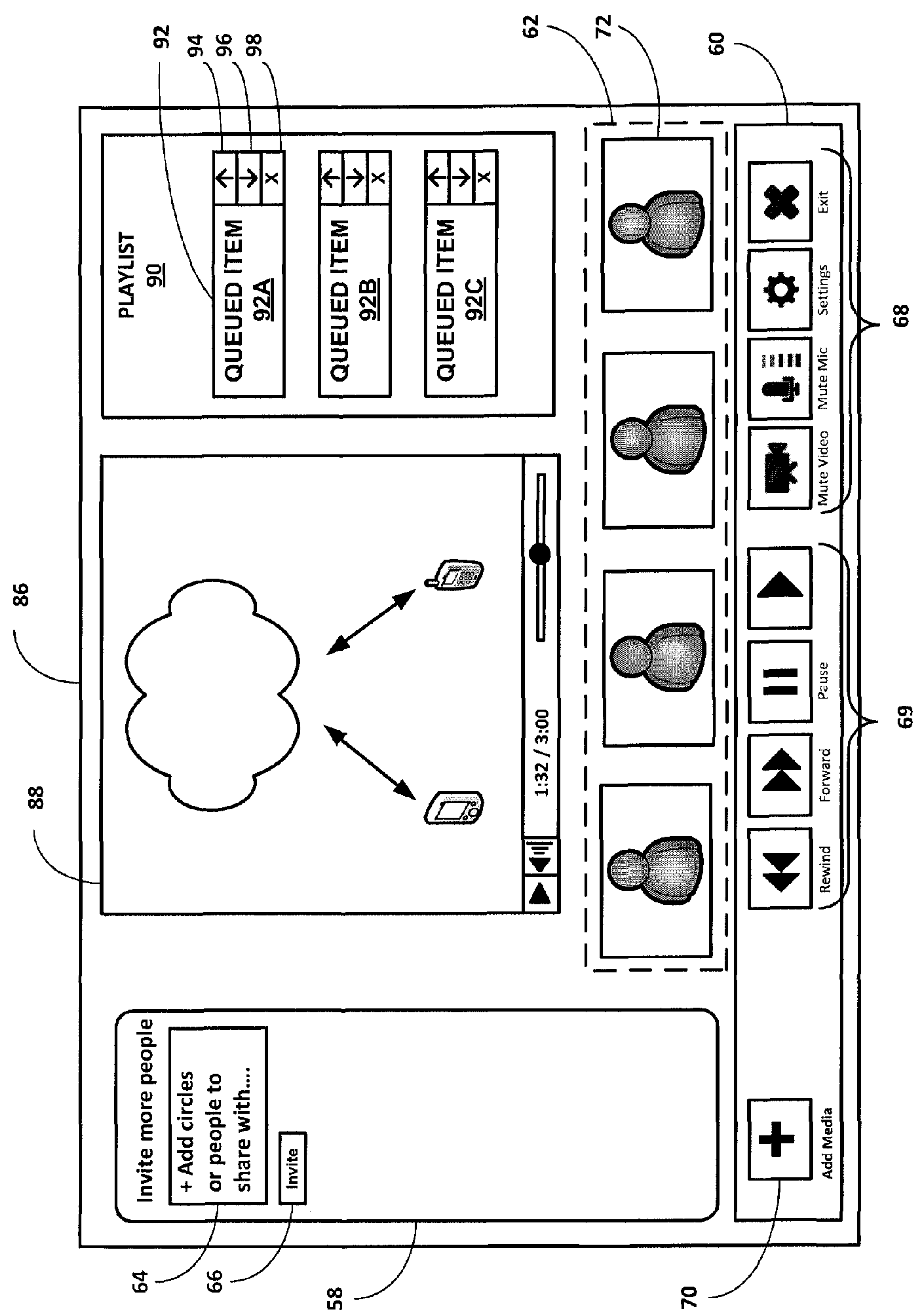
FIG. 5 is a block diagram illustrating an example of a graphical user interface that displays multimedia content, a playlist, and data of one or more users, in accordance with one or more aspects of the present disclosure.

FIG. 5 is a block diagram illustrating an example of a graphical user interface that displays multimedia content, a playlist, and data of one or more users, in accordance with one or more aspects of the present disclosure. FIG. 5 includes GUI 86 that may be displayed by output device 18 of client device 10. GUI 86 further includes invitation panel 58 and control buttons 64, 66 as described in FIG. 2. GUI 86 further includes control panel 60 and buttons 68, 69, and 70 as described in FIG. 2. GUI 86 further includes user panel 62 and one or more video feeds such as video feed 72 as described in FIG. 2. In addition, GUI 86 displays multimedia content 88, as shown in FIG. 5.

In some examples, GUI 86 may further include a playlist 90. Playlist 90 may include different multimedia content selected by users in the communication session. For instance, a user may select control button 70 as described in FIG. 3 to select multimedia content. The selected multimedia content may be queued in playlist 90 for later output by each communication device in the communication session. Different multimedia contents may be uniquely represented by queued items 92A-C (collectively referred to as "queued items 92") in playlist 90. For instance, queued item 92A may be an image, text, or other graphical content that represents multimedia content queued in playlist 90.

In some examples, one or more control buttons may be associated with a queued item 92. For instance, control buttons 94, 96, and 98 are associated with queued item 92A. Control button 94, when selected, may cause a communication module executing on a communication client that displays GUI 86 to increase the priority of queued item 92A within playlist 90. Control button 96, when selected, may cause the communication module to decrease the priority of queued item 92A. When the priority of a queued item is changed, the position of the queued item as displayed within playlist 90 may change. Furthermore, when the priority of a queued item is changed, the order in which queued items are selected from playlist 90 may change in accordance with the change in priority. For instance, if the priority of queued item 92A is decreased below the priority of queued item 92B, queued item 92B will be selected for output by the communication client before queued item 92A. Similarly, the priority of queued item 92C is increased above the priority of queued item 92B, queued item 92C may be selected for output by the communication client before queued item 92B. In some examples, control button 98, when selected, may delete queued item 92A from playlist 90.

As discussed herein, aspects of the present disclosure include techniques that provide different control model modes for multimedia content displayed during the communication session. A control model mode may specify the one or more levels of control that each user in a communication session may have over multimedia content currently outputting in the communication session and multimedia content queued in playlist 90. By providing different types of control models, aspects of the present disclosure enable users to change the type of social interaction in a communication session.

One control model includes the asymmetric or "strong controller" model. In a strong controller model, one or more users may be designated as strong controllers. For instance, a creator of a communication session may be designated as a strong controller. In the current example, user 20 may create communication session 32 via communication client 12 and therefore may be designated as a strong controller. A user designated as a strong controller in communication session 32 may have authority to select multimedia content to be output to each communication client connected to communication session 32. The strong-controller user may also control settings associated with multimedia content 88 (e.g., adjusting volume settings or playback of the multimedia content 88). Other control settings may include settings of a video game. A user designated as a strong controller may also add and remove multimedia content to playlist 90 and further change the priority of queued items 92A-C within playlist 90. In some examples, a strong-controller user may further delegate strong-controller authority to one or more users to provide such delegates with strong-controller authority. Additionally, the strong-controller user may revoke a previously provided strong-controller authority to one or more users.

In one example, the GUI 86 can include an indicator that indicates which user is the strong-controller user or which users have strong-controller authority. For example, the strong-controller user can modify at least the multimedia content that is contemporaneously outputting at the second computing device or the priority of queued multimedia content in the queue of multimedia content. Additionally, the strong-controller user can have the authority to invite other users to participate in the communication session. The GUI 86 can include video feeds 72 that may include a visual expression of a user participating in communication session 32. The individual video feed of strong-controller users can include an indicator to notify other users which user is strong-controller user or which subset of users participating in the communication have the strong-controller authority to modify the multimedia content. For example, the individual video feed may have an outline, different shape, or other indicator that indicates a particular user is the strong-controller user and/or has strong-controller authority. Additionally, in an example with multiple users having strong-controller authority, the GUI 82 may indicate the particular user of the users having strong-controller authority that has modified the multimedia content. For example, if user 40A changed the priority of one of the queued items 92*n* the playlist 90 an indicator can popup or be presented to the other users 20, 40B, and 40C in GUI 82 that user 40A was the user that made the modification.

Another control model includes a symmetric control model. In symmetric control model, all users participating in communication session 32 have equal authority modify aspects of communications session 32. For example, each user participating in communication session 32 may add, remove, and/or change the priority of queued items 92 88 in playlist 90. Each user may further modify the volume and/or playback of multimedia content 84 that is currently outputting on each communication device.

Example Method

Figure 6:
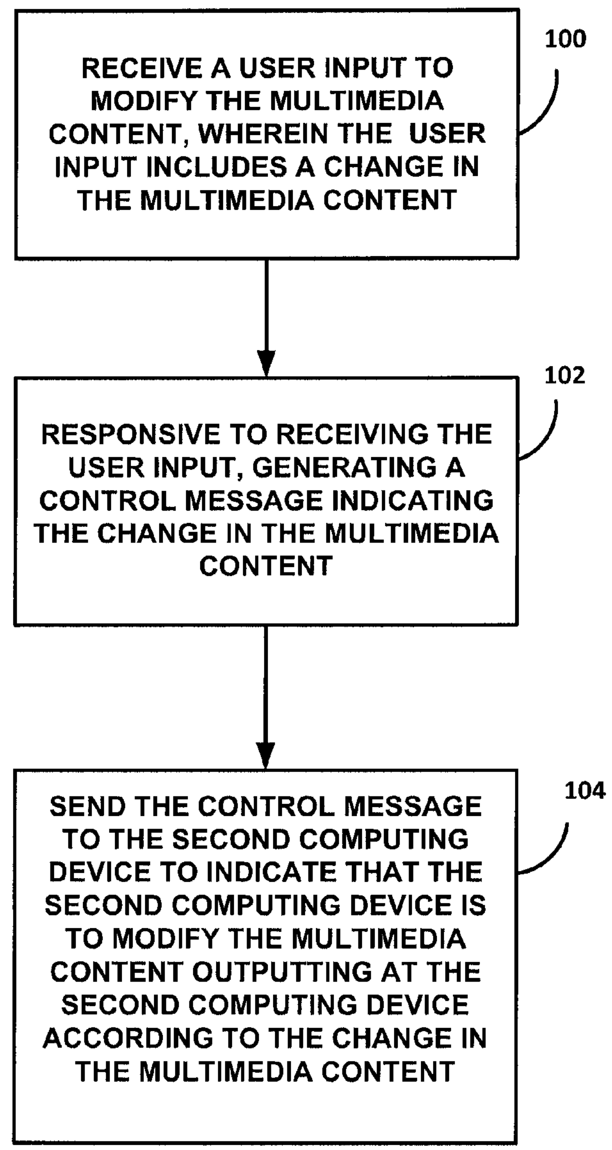
FIG. 6 is a flow diagram illustrating an example method for modifying multimedia content during a communication session, in accordance with one or more aspects of this disclosure.

FIG. 6 is a flow diagram illustrating an example method for modifying multimedia content during a communication session, in accordance with one or more aspects of this disclosure. For purposes of illustration only, the example method is described below within the context of communication system 2 of FIG. 1, client device 10 of FIG. 2, and the GUI 86 of FIG. 5.

User 20 may initially provide user input at communication client 12 to join communication session 32. Upon receiving the request, communication module 14 may cause communication client 12 to join the session 32. Once communication client 12 has joined communication session 22, communication client 12 may further output multimedia content 24 that is contemporaneously outputting at a second computing device. For instance, output device 18 of communication client 12 may display a video that is contemporaneously outputting on computing devices 36A-C. As discussed herein, aspects of the present disclosure include techniques to provide for simultaneous control of the multimedia content. Simultaneously control of the multimedia content may, in some example, provide individuals with an experience similar to actually socializing in person.

In the example process of FIG. 6, client device 10 may receive, by an input device 16, a user input to modify the multimedia content 88, where the input to modify may include a change in the multimedia content 88 (100). For example, user 20 may provide input selecting a control button 69 to modify the multimedia content 88 outputting at client device 10. Responsive to receiving the user input to modify, client device 10 may generate a control message indicating the change in the multimedia content (102). For example, communication module 14 may generate a control message indicating the change in the multimedia content. Computing device 10 may send the control message to the second computing device to indicate that the second computing device is to modify the multimedia content outputting at the second computing device according to the change in multimedia content (104). For example, communication module 14 may send the control message to the second computing device (e.g., other computing devices coupled to communication session 32) via server device 28 indicating that the second computing device is to modify the multimedia content outputting at the second computing device according to the change.

Example Method

Figure 7:
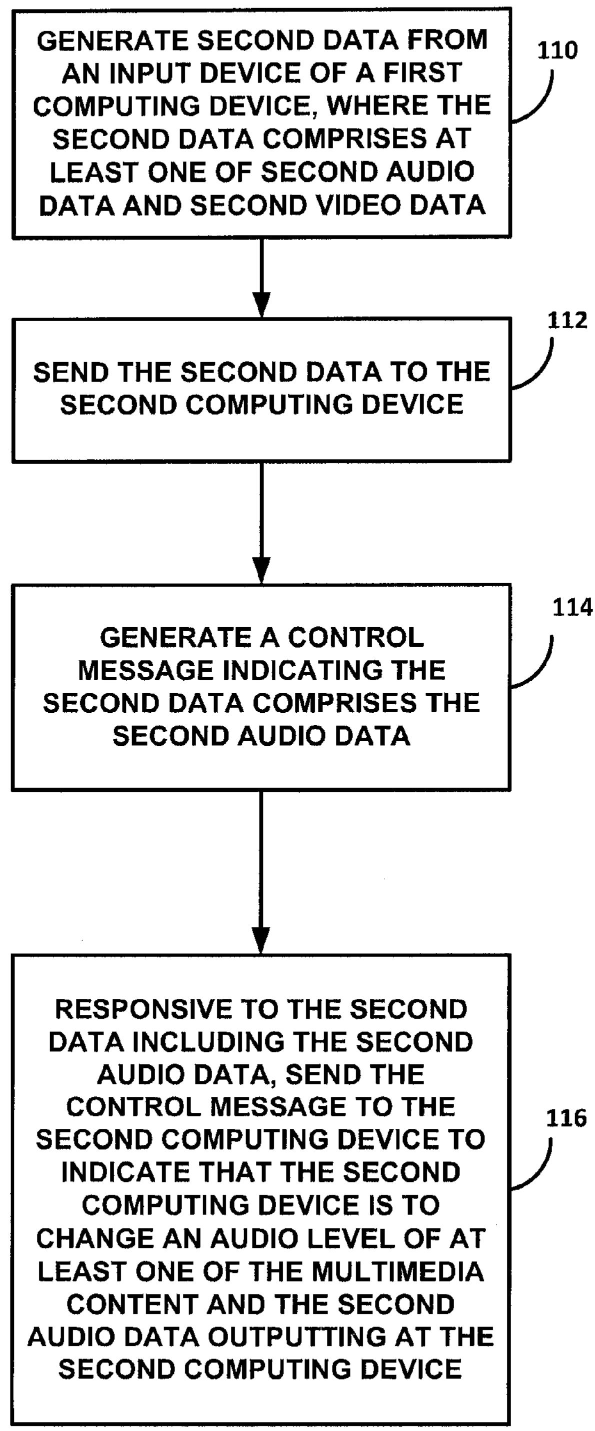
FIG. 7 is a flow diagram illustrating an example method for changing an audio level of the multimedia content or audio data of a user during a communication session in accordance with one or more aspects of the present disclosure.

FIG. 7 is a flow diagram illustrating an example method for changing an audio level of the multimedia content or audio data of a user during a communication session in accordance with one or more aspects of the present disclosure. For purposes of illustration only, the example method is described below within the context of communication system 2 of FIG. 1, client device 10 of FIG. 2, and the GUI 86 of FIG. 5.

User 20 may initially provide user input at communication client 12 to join communication session 32. Upon receiving the request, communication module 14 may cause communication client 12 to join the session 32. Once communication client 12 has joined communication session 22, communication client 12 may further output multimedia content 24 that is contemporaneously outputting at a second computing device. For instance, output device 18 of communication client 12 may display a video that is contemporaneously outputting on computing devices 36A-C. As discussed herein, aspects of the present disclosure include techniques to modify an audio level of audio data that includes a representation of an audio expression of a user. Modifying the audio level of audio data may, in some examples, enable users to better hear sounds generated from audio data including audio data of users or the audio data of the multimedia content.

In the example of method of FIG. 7, client device 10 may generate, by an input device 16, second data that includes at least one of second audio data and second video data (110). For example, user 20 viewing multimedia content 88 may provide an audible and or visible reaction. Input device 16 may generate at least second audio data and second video data. The client device 10 may send the second data to the second computing device (112). For example, communication client 12 may send the second data including the second audio data and the second video data to the second computing device (e.g., other computing devices coupled to communication session 32). The client device 10 may generate a control message indicating the second data includes the second audio data (114). For example, communication module 14 may generate a control message indicating that the second data includes the second audio data. In response to the second data including the second audio data, the computing device 10 may send the control message to the second computing device indicating that the second computing device is to change an audio level of at least one of the multimedia content and the second audio data outputting at the second computing device (116). For example, communication module 14 may send the control message to the second computing device (e.g., other computing devices coupled to communication session 32) via server device 28 indicating that the second computing device is to change an audio level of at least one of the multimedia content and the second audio data outputting at the second computing device.

Example Method

Figure 8:
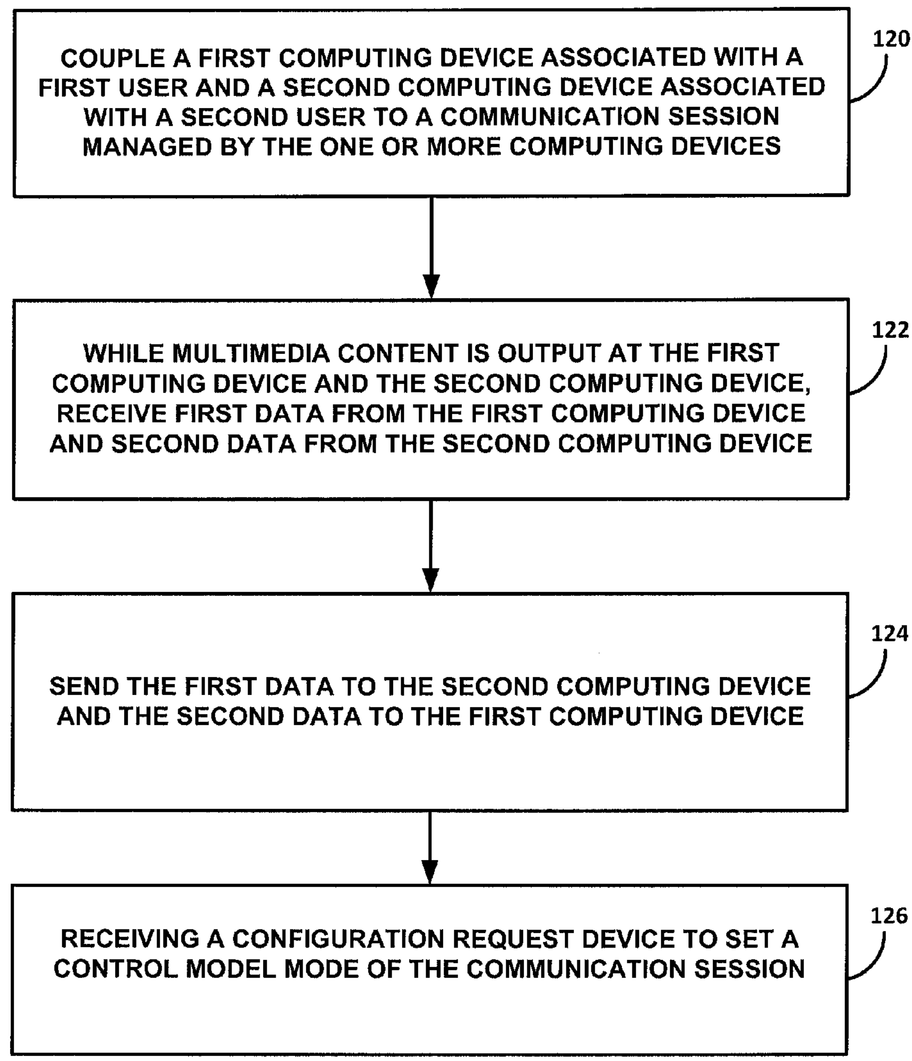
FIG. 8 is a flow diagram illustrating an example method for a server device providing a communication session, in accordance with one or more aspects of the present disclosure.

FIG. 8 is a flow diagram illustrating an example method for a server device providing a communication session, in accordance with one or more aspects of the present disclosure. For purposes of illustration only, the example method is described below within the context of communication system 2 and server device 28 of FIG. 1.

In some examples, the method of FIG. 8 may include coupling, by the one or more computing devices, a first computing device associated with a first user and a second computing device associated with a second user to a communication session managed by the one or more computing devices (120). For example, server device 23 may couple client device 10 associated with user 20 and client device 36A associated with user 40A to communication session 32 as discussed herein with respect to FIG. 1. The communication session may enable communication between the first computing device and a second computing device. For example, communication session 32 may enable communication between client device 10 and client device 36A. Additionally, the first computing device and the second computing device may be one or two or more computing devices.

The method of FIG. 8 may further include while multimedia content is output at the first computing device and the second computing device, receiving, by the one or more computing devices, first data from the first computing device and second data from the second computing device (122). For example, while multimedia content is output at client device 10 and client device 36A, server device 28 may receive first data from client device 10 and second data from client device 36A. The first data may include data captured by input device 16 associated with client device 10 and the second data may include data captured by an input device associated with client device 36A.

In some examples, the method of FIG. 8 may include sending, by the one or more computing devices, the first data to the second computing device and the second data to the first computing device. For example, server device 28 may send the first data to client device 36A and the second data to client device 10. In some examples, the method may further include receiving, by the one or more computing devices, a configuration request to set a control model mode of the communication session. For example, server device 28 may receive a configuration request from client device 10 to set a control model mode of communication session 32. As discussed herein, the control model mode may control which one or more computing devices (e.g., client device 10 and client devices 36) communicatively coupled via communication session 32 has permission to modify at least the multimedia content output at the one or more computing devices (e.g., client device 10 and client devices 36). In some examples, the control model mode is set to one of an asymmetric control model or a symmetric control model based on at least the configuration request. The asymmetric control model may provide a subset of users in the communication session with the permission to modify at least the multimedia content output at the two or more computing devices. The symmetric control model may provide all the users in the communication session with the permission to modify at least the multimedia content output at the two or more computing devices.

In some examples, the method may further include receiving, by the one or more computing devices, a control message from the first computing device indicating a change in the multimedia content outputting at the first computing device. For example, server device 32 may receive a control message from client device 10 indicating a change in the multimedia content 24 outputting at client device 10. The method may include sending, by the one or more computing devices, the control message to the second computing device indicating that the second computing device is to modify the multimedia content outputting at the second computing device according to the change in the multimedia content. For example, server device 28 may send the control message to client device 36A indicating that client device 36A is to modify the multimedia content outputting at client device 36A according to the change in the multimedia content.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

The invention claimed is:

1. A method, comprising:

joining, by a first computing device, a communication session managed by a server device, wherein the communication session enables communication between the first computing device and a second computing device, wherein the second computing device is communicatively coupled to the first computing device using the communication session, and wherein the first computing device and the second computing device are each one or two or more computing devices communicatively coupled via the communication session;

outputting, by the first computing device, multimedia content, wherein the multimedia content is also output at the second computing device;

while the first computing device outputs the multimedia content, receiving, by the first computing device, data from the second computing device using the communication session, wherein the data comprises data captured by an input device of the second computing device;

outputting, by the first computing device, the data received from the second computing device;

sending, by the first computing device, a configuration request to the server device to set a control model mode of the communication session, wherein the control model mode controls which one or more computing devices of the two or more computing devices communicatively coupled via the communication session has permission to modify at least the multimedia content output at the two or more computing devices;

receiving, by the first computing device, a first user input to independently modify the multimedia content, wherein the first user input includes a change in the multimedia content;

responsive to receiving the first user input, generating, by the first computing device, a first control message indicating the change in the multimedia content; and sending, by the first computing device, the first control message to the second computing device indicating that the second computing device is to modify the multimedia content outputting at the second computing device according to the change in the multimedia content.

2. The method of claim 1, wherein the control model mode is set to one of an asymmetric control model or a symmetric control model based on at least the configuration request, wherein the asymmetric control model provides a subset of users in the communication session with the permission to modify at least the multimedia content output at the second computing device, and wherein the symmetric control model provides all the users in the communication session with the permission to modify at least the multimedia content output at the second computing device.

3. The method of claim 1, wherein the change in the multimedia content includes at least one of fast forwarding, rewinding, pausing, and playing the multimedia content.

4. The method of claim 1, further comprising:

receiving, by the first computing device, a second user input to display a group of identifiers each associated with different multimedia content; and responsive to receiving the second user input, displaying, by the first computing device, the group of identifiers.

5. The method of claim 4, further including:

receiving, by the first computing device, a third user input to select an identifier of the group of identifiers; and adding, by the first computing device, selected multimedia content associated with the selected identifier to a multimedia content queue.

6. The method of claim 5, further comprising:

receiving, by the first computing device, a fourth user input to modify a priority of the selected multimedia content in the multimedia content queue; and responsive to receiving the fourth user input, modifying, by the first computing device, the priority of the selected multimedia content in the multimedia content queue.

7. The method of claim 5, further comprising:

receiving, by the first computing device, a fifth user input to delete the selected multimedia content from the multimedia content queue; and responsive to receiving the fifth user input, deleting, by the first computing device, the selected multimedia content from the multimedia content queue.

8. The method of claim 5, wherein the asymmetric control model further provides the subset of the users in the communication session with permission to modify a priority of multimedia content in the multimedia content queue, and wherein the symmetric control model further provides all the users in the communication session with permission to modify a priority of multimedia content in the multimedia content queue.

9. The method of claim 1, wherein the data captured by the input device of the second computing device includes as at least one of audio data and video data.

10. The method of claim 1, further comprising:

generating, by an input device of the first computing device, second data, wherein the second data comprises at least one of second audio data and second video data;

sending, by the first computing device, the second data to the second computing device using the communication session; and generating, by the first computing device, a second control message indicating the second data comprises at least the second audio data.

11. The method of claim 10, further comprising:

sending, by the first computing device, the second control message to the second computing device to indicate that the second computing device is to change an audio level of the multimedia content outputting at the second computing device.

12. The method of claim 10, further comprising:

sending, by the first computing device, the second control message to the second computing device to indicate that the second computing device is to change an audio level of the second data comprising the second audio data outputting at the second computing device.

13. The method of claim 1, further comprising:

displaying, by the first computing device, a group of identifiers each associated with one or more users;

receiving, by the first computing device, a sixth user input to select an identifier of the group of identifiers; and sending, by the first computing device, an invitation to the one or more users associated with the selected identifier to join the communication session.

14. A non-transient computer-readable storage medium comprising instructions that, when executed, cause one or more processors to perform operations comprising:

joining, by a first computing device having at least one processor, a communication session managed by a server device, wherein the communication session enables communication between the first computing device and a second computing device, wherein the second computing device is communicatively coupled to the first computing device using the communication session, and wherein the first computing device and the second computing device are each one or two or more computing devices communicatively coupled via the communication session;

outputting, by the first computing device, multimedia content, wherein the multimedia content is also output at the second computing device;

while the multimedia content is outputting at the first output device, receiving, by the first computing device, data from the second computing device using the communication session, wherein the data comprises data captured by an input device of the second computing device;

outputting, by the first computing device, the data received from the second computing device;

sending, by the first computing device, a configuration request to the server device that sets a control model mode of the communication session, wherein the control model mode controls which one or more computing devices of the two or more computing devices communicatively coupled via the communication session has permission to modify at least the multimedia content output at the two or more computing devices;

receiving, by the first computing device, a first user input to independently modify the multimedia content, wherein the first user input includes a change in the multimedia content;

responsive to receiving the first user input, generating, by the first computing device, a first control message indicating the change in the multimedia content; and sending, by the first computing device, the first control message to the second computing device indicating that the second computing device is to modify the multimedia content outputting at the second computing device according to the change in the multimedia content.

15. The non-transient computer-readable storage medium of claim 14, where the operations further comprise:

receiving a second user input to display a group of identifiers each associated with different multimedia content;

responsive to receiving the second user input, displaying the group of identifiers;

receiving a third user input to select an identifier of the group of identifiers; and responsive to receiving the third user input, adding selected multimedia content associated with the selected identifier to a multimedia content queue.

16. A computing device, comprising one or more processors, the one or more processors being configured to perform a method of:

joining a communication session managed by a server device, wherein the communication session enables communication between the computing device and a second computing device, wherein the second computing device is communicatively coupled to the computing device using the communication session, and wherein the computing device and the second computing device are each one or two or more computing devices communicatively coupled via the communication session;

outputting multimedia content, wherein the multimedia content is also output at the second computing device;

while the computing device outputs the multimedia content, receiving data from the second computing device using the communication session, wherein the data comprises data captured by an input device of the second computing device;

outputting the data received from the second computing device;

sending a configuration request to the server device to set a control model mode of the communication session, wherein the control model mode controls which one or more computing devices of the two or more computing devices communicatively coupled via the communication session has permission to modify at least the multimedia content output at the two or more computing devices;

receiving, by the first computing device, a first user input to independently modify the multimedia content, wherein the first user input includes a change in the multimedia content;

responsive to receiving the first user input, generating, by the first computing device, a first control message indicating the change in the multimedia content; and sending, by the first computing device, the first control message to the second computing device indicating that the second computing device is to modify the multimedia content outputting at the second computing device according to the change in the multimedia content.

17. The computing device of claim 16, wherein the method further comprises:

receiving a second user input to display a group of identifiers each associated with different multimedia content;

responsive to receiving the second user input, displaying the group of identifiers;

receiving a third user input to select an identifier of the group of identifiers; and responsive to receiving the third user input, adding selected multimedia content associated with the selected identifier to a multimedia content queue.

* * * * *